H. C. DRUMMOND.
SPIRIT LEVEL AND PLUMB.
APPLICATION FILED JAN. 3, 1921.
1,435,054.
Patented Nov. 7, 1922.
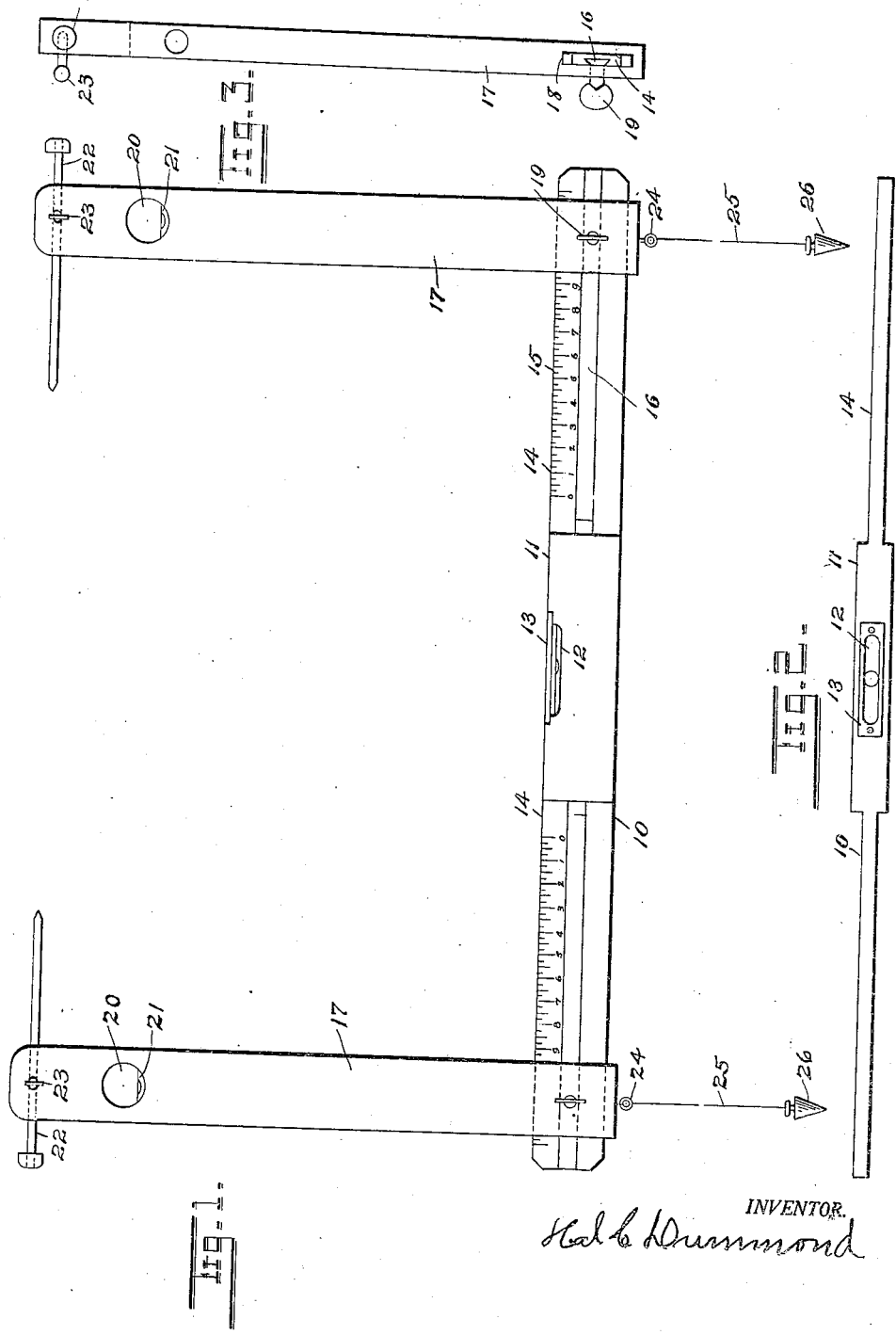
INVENTOR.
Hal C Drummond Patented Nov. 7, 1922.

1,435,054

UNITED STATES PATENT OFFICE.

HAL C. DRUMMOND, OF DAVENPORT, IOWA.

SPIRIT LEVEL AND PLUMB.

Application filed January 3, 1921. Serial No. 434,742.

(FILED UNDER THE ACT OF MARCH 3, 1883, 22 STAT. L., 625.)

*To all whom it may concern:*

Be it known that I, HAL C. DRUMMOND, a citizen of the United States, and a resident of Davenport, county of Scott, and State of Iowa, have invented an Improvement in Spirit Levels and Plumbs, of which the following is a specification.

The invention described herein may be used by the Government, or any of its officers or employees in prosecution of work for the Government, or by any other person in the United States, without payment to me of any royalty thereon.

My invention relates to improvements in spirit levels and plumbs, for use primarily in setting and leveling motors, line and jack shafts, etc.

The main object of the invention is the provision of a level and plumbs by means of which the level and plumb lines may be secured by one operation and also to provide means for checking the result of the operation.

The invention also contemplates the provision of a simple, cheap and efficient level and plumb.

With these and other objects in view the invention resides in the novel arrangement and combination of parts and in the details of construction hereinafter described and claimed, it being understood that changes in the precise embodiment of the invention herein disclosed may be made within the scope of what is claimed without departing from the spirit of the invention.

One practical embodiment of the invention is shown in the accompanying drawing, wherein:

Fig. 1 is a view in elevation of a level and plumb constructed in accordance with the invention;

Fig. 2 is a plan view of the level;

Fig. 3 is an end elevation of the device, the plumb bobs removed.

Referring to the drawings by numerals of reference; 10 indicates a level which may be conveniently made of wood, laminated or veneered to prevent warping and metal bound for protection thereof, formed with an enlarged portion 11 apertured to receive the level tube 12 which is protected in the usual manner by a slotted plate 13 secured by screws or otherwise to the portion 11. Each end 14 of the level is reduced and provided with graduations 15 so that the plumbs may be set equidistant from the center. Each end 14 is grooved longitudinally to receive an inset metal strip 16 which serve as surfaces against which the clamping screws for the plumbs abut.

Plumbs 17 are provided, mortised at their lower ends as indicated at 18 for the reception of the ends 14 of the level with an easy sliding fit. Set screws 19 are threaded into the plumbs and engage the strip 16 to bind the plumbs in position on the level. Each plumb is provided at a suitable position with an aperture 20 in which is mounted a level tube 21 through which the plumb level may be observed and is further provided, at its upper end with an aperture for the reception with a sliding fit of the tram point 22 which may be locked in adjusted position by suitable means, such as the clamp screw 23.

At the lower end of each plumb a connector such as the eye 24 is provided to which may be attached a cord 25 carrying the plumb bob 26 through means of which the accuracy of the setting of the instrument may be checked.

As the method of operation of devices of this character is well known to every mechanic, only a brief description of its operation will be given When it is desired to level a line shaft the main portion or level 10 is used, being placed upon the shaft and the shaft adjusted until the level reading indicates a horizontal position.

When a motor is to be set, the tram points 22 are brought to position in the center punch at each end of the motor shaft and clamped in place. The motor is then adjusted to get a level reading in the tube 12 which adjustment will also give the plumb and tram line for line shafts to the motor.

Having thus described my invention, what I claim as new and desire to secure by Letters Patent, is:

1. A level and plumb, including a level having reduced graduated ends, plumbs mortised for the reception of the ends and slidably mounted on the ends, means for securing the plumbs in adjusted positions on the ends, level tubes carried by the plumbs, tram points adjustable in the upper ends of the plumbs, means for clamping the tram points in adjusted position, connectors at the lower ends of the plumbs and plumb bobs attached to the connectors.

2. The combination with a level having reduced graduated ends, of plumbs mounted for adjustment on the ends, means for clamping the plumbs in adjusted positions, level tubes carried by the plumbs, tram points adjustably mounted in the plumbs and means for clamping the tram points in adjusted positions.

3. The combination with a level, of plumbs mounted for adjustment on the level, level tubes carried by the plumbs and adjustable tram points carried by the plumbs.

4. The combination with a level, of plumbs adjustable on the level, adjustable tram points carried by the plumbs and plumb bobs attached to the plumbs.

HAL C. DRUMMOND.